US006946520B2

(12) United States Patent
Karande et al.

(10) Patent No.: US 6,946,520 B2
(45) Date of Patent: Sep. 20, 2005

(54) FABRICATED ARTICLES PREPARED FROM BLENDS OF SUBSTANTIALLY RANDOM ETHYLENE/PROPYLENE/VINYL AROMATIC INTERPOLYMERS WITH POLYPROPYLENE

(75) Inventors: Seema V. Karande, Pearland, TX (US); Martin J. Guest, Rheinmunster (DE); Satoru Moriya, Ichihara (JP); Yunwa W. Cheung, Lake Jackson, TX (US); Bharat I. Chaudhary, Pearland, TX (US); Shuichi Murakami, Sodegaura (JP)

(73) Assignee: Dow Global Technologies, Inc., Midland, MI (US)

( * ) Notice: Subject to any disclaimer, the term of this patent is extended or adjusted under 35 U.S.C. 154(b) by 134 days.

(21) Appl. No.: 10/468,171

(22) PCT Filed: Feb. 27, 2002

(86) PCT No.: PCT/US02/05952

§ 371 (c)(1),
(2), (4) Date: Aug. 14, 2003

(87) PCT Pub. No.: WO02/068529

PCT Pub. Date: Sep. 6, 2002

(65) Prior Publication Data

US 2004/0077787 A1 Apr. 22, 2004

Related U.S. Application Data

(60) Provisional application No. 60/271,697, filed on Feb. 27, 2001.

(51) Int. Cl.$^7$ .............................. C08F 8/00; C08L 9/00; C08L 23/00; C08L 23/09; C08L 53/00

(52) U.S. Cl. ......................... 525/90; 525/191; 525/232; 525/240; 525/241; 524/500; 524/502; 524/505; 524/515

(58) Field of Search .......................... 525/90, 191, 232, 525/240, 241; 524/500, 502, 505, 515

(56) References Cited

U.S. PATENT DOCUMENTS

| | | | |
|---|---|---|---|
| 2,933,480 A | 4/1960 | Gresham et al. | |
| 3,151,173 A | 9/1964 | Nyce | |
| 3,211,709 A | 10/1965 | Adamek et al. | |
| 3,893,989 A | 7/1975 | Leicht et al. | |
| 4,113,802 A | 9/1978 | Matteoli et al. | |
| 5,055,438 A | 10/1991 | Canich | |
| 5,057,475 A | 10/1991 | Canich et al. | |
| 5,064,802 A | 11/1991 | Stevens et al. | |
| 5,096,867 A | 3/1992 | Canich | |
| 5,132,380 A | 7/1992 | Stevens et al. | |
| 5,189,192 A | 2/1993 | LaPointe et al. | |
| 5,321,106 A | 6/1994 | LaPointe | |
| 5,347,024 A | 9/1994 | Nickias et al. | |
| 5,350,723 A | 9/1994 | Neithamer et al. | |
| 5,374,696 A | 12/1994 | Rosen et al. | |
| 5,399,635 A | 3/1995 | Neithamer et al. | |
| 5,460,818 A | 10/1995 | Park et al. | |
| 5,470,993 A | 11/1995 | Devore et al. | |
| 5,703,187 A | 12/1997 | Timmers | |
| 5,721,185 A | 2/1998 | LaPointe et al. | |
| 5,866,704 A | 2/1999 | Nickias et al. | |
| 5,872,201 A | 2/1999 | Cheung et al. | |
| 5,883,213 A | 3/1999 | Arai et al. | |
| 5,919,983 A | 7/1999 | Rosen et al. | |
| 5,959,047 A | 9/1999 | Nickias et al. | |
| 6,015,868 A | 1/2000 | Nickias et al. | |
| 6,118,013 A | 9/2000 | Devore | |
| 6,150,297 A | 11/2000 | Campbell, Jr. et al. | |
| 6,184,294 B1 | 2/2001 | Park et al. | |
| 6,376,095 B1 * | 4/2002 | Cheung et al. | ............. 428/516 |
| 6,444,302 B1 * | 9/2002 | Srinivas et al. | ........... 428/315.5 |

FOREIGN PATENT DOCUMENTS

| | | |
|---|---|---|
| EP | 0 416 815 B1 | 8/1997 |
| WO | WO-94/00500 A1 | 1/1994 |
| WO | WO-95/32095 A1 | 11/1995 |
| WO | WO-98/09999 A2 | 3/1998 |
| WO | WO-99/20685 | 4/1999 |
| WO | WO-99/20685 A1 | 4/1999 |

OTHER PUBLICATIONS

International Search Report, Oct. 21, 2002.

* cited by examiner

Primary Examiner—Nathan M. Nutter
(74) Attorney, Agent, or Firm—Baker & McKenzie LLP

(57) ABSTRACT

This invention relates to fabricated articles, including films or sheets prepared from blends of substantially random ethylene/propylene/vinyl aromatic monomer interpolymers with propylene homopolymers or copolymers. The fabricated articles exhibit high toughness, tensile properties and heat resistance and low stress whitening, and further can exhibit desirable optical properties, especially when in the form of a film or sheet.

10 Claims, No Drawings

FABRICATED ARTICLES PREPARED FROM BLENDS OF SUBSTANTIALLY RANDOM ETHYLENE/PROPYLENE/VINYL AROMATIC INTERPOLYMERS WITH POLYPROPYLENE

CROSS REFERENCE TO RELATED APPLICATIONS

This application is a 371 national phase filing of PCT/US02/05952, filed Feb. 27, 2002, which claims priority to U.S. Provisional Application No. 60/271,697, filed Feb. 27, 2001, both of which are incorporated by reference herein in their entirety.

FEDERALLY SPONSORED RESEARCH STATEMENT

Not applicable.

REFERENCE TO MICROFICHE APPENDIX

Not applicable.

TECHNICAL FIELD

This invention relates to fabricated articles, including films or sheets prepared from blends of substantially random ethylene/propylene/vinyl aromatic monomer interpolymers with propylene homopolymers or copolymers. The fabricated articles exhibit high toughness, tensile properties and heat resistance and low stress whitening, and further can exhibit desirable optical properties, especially when in the form of a film or sheet.

BACKGROUND OF THE INVENTION

The generic class of materials covered by substantially random α-olefin/vinyl aromatic monomer interpolymers, and especially ethylene/styrene interpolymers ("ESI") and ethylene/propylene/styrene interpolymers ("EPS") and are known in the art. They offer a range of material structures and properties which makes them useful for varied applications, such as compatibilizers for blends of polyethylene and polystyrene as described in U.S. Pat. No. 5,460,818. Although of utility in their own right, Industry is constantly seeking to improve the applicability of these interpolymers. Such enhancements may be accomplished via additives or the like, but it is desirable to develop technologies such as blend systems to provide improvements in processability and/or performance without requiring further addition of other additives.

One area where such advantages can be manifested is in blends of these interpolymers with propylene-based polymers. Propylene homopolymers and copolymers are used in a wide range of applications where stiffness is required. However such polymers are often lacking in impact resistance, can be difficult to fabricate, and often exhibit significant stress whitening. Historically poly (vinyl chloride), (PVC) has been used for applications requiring such combinations of properties and, in addition, as is required for certain applications, PVC is also able to impart specific haptics or "touch and feel". However, PVC is increasingly under scrutiny due to environmental concerns.

Other attempted solutions to this problem have involved the preparation of blends of propylene homopolymers and copolymers with for instance ethylene/α-olefin copolymers to improve impact resistance. However such blends typically have poor optical properties due to the incompatibility of the individual blend components and also do not have the desired haptics of PVC.

In addition, solutions have been proposed which have involved blending propylene homopolymers and copolymers with polymers containing styrenic functionality (known to deliver PVC-like haptics). For instance, JP 10/60194 describes blend compositions consisting of 50–99 wt percent propylene homopolymer or copolymer and 1–50 wt percent of an ethylene/vinylidene aromatic monomer copolymer; (consisting of 50–97 mol percent ethylene and 3–50 mol percent vinylidene aromatic monomer). Proposed advantages of such blends were high surface hardness, excellent mar resistance and a good balance with impact strength.

In addition, JP 10/273566 discloses an olefinic resin composition of 1–99 wt percent propylene homopolymer or copolymer having a refractive index 1.490 to 1.510 at 25° C. and 1–99 wt percent of a copolymer of a vinyl aromatic monomer with ethylene or a $C_3$–$C_{20}$ alpha olefin having a refractive index 1.490 to 1.510 at 25° C. The refractive index of the vinyl aromatic copolymer matched that of the polypropylene. In addition, blends consisting of terpolymers were also produced with ethylene, styrene plus either 1-butene, 1-hexene or 1-octene.

JP 07316356 A describes a soft polypropylene-based resin composition with high transparency and softness, consisting of 5–70 wt percent of a crystalline polypropylene and 30–95 wt percent of an ethylene/styrene/α-olefin elastomer having from 0.01 to 30 mol percent styrene and at least 30 mol percent of a $C_5$ or greater α-olefin. The resin composition has high softness, transparency and impact, whitening and cold resistance.

JP 07316355 A also describes a soft polypropylene resin composition consisting of 5–70 wt percent of a crystalline polypropylene and 30–95 wt percent of an ethylene/styrene/1-butene elastomer having from 0.01 to 30 mol percent styrene and at least 45 mol percent 1-butene. The resin composition has high softness, transparency and impact, whitening and cold resistance.

JP 07330982 A describes a thermoplastic resin composition with high resistance to compression set-comprising 1) polypropylene resin, 2) ethylene/α-olefin copolymer rubber and 3) ethylene/styrene/α-olefin copolymer. Also claimed was a process for preparing the composition in which 2) was crosslinked under a shearing process while 1) is melted. The crosslinked composition had high resistance to compression set.

JP 10/87918 describes a resin composition consisting of 1–99 wt percent propylene homopolymer and/or propylene copolymer, and 1–99 wt percent of an ethylene/vinyl aromatic copolymer; with 1–55 mol percent vinyl aromatic content with a specific stereo regular alternating structure. The resin composition was claimed to be superior in a balance of toughness/stiffness for use in electronic, electrical parts, injection-molded articles, film pipe or other applications Blends of hydrogenated random styrene butadiene rubber and polypropylene have also been used for such applications. However the hydrogenated SBR blend component is expensive given the required hydrogenation step after polymer formation.

The above references, whilst generally providing useful blend compositions, do not address the specific merits in terms of unique combinations of material properties that have been found in the current invention for fabricated articles produced from blends of substantially random ethylene/propylene/vinyl aromatic monomer interpolymers with propylene homopolymers or copolymers. Thus it would be highly advantageous to have available fabricated articles, such as a sheet or film having good haze (<15 percent for a 0.38 mm (15 mil) thickness film) while exhibiting enhanced toughness and heat resistance and significantly less whitening when subjected to stress. In addition it would also be highly advantageous if such films could exhibit "PVC-like" haptics while being prepared from a styrenic polymer, the preparation of which does not require the expensive hydrogenation step.

SUMMARY OF THE INVENTION

The present invention pertains to fabricated articles, especially films and sheets prepared from blends of one or more substantially random ethylene/propylene/vinyl aromatic monomer interpolymers with one or more propylene homopolymer and/or copolymers. In one aspect, we have surprisingly found that such sheets or films have less than or equal to 20 percent haze and when fabricated into 0.38 mm (15 mil) thickness have a room temperature total dart impact energy of greater than or equal to 0.103 kg m (0.75 ft lb). Due to the styrenic functionality of the substantially random interpolymer component, sheets or films fabricated from such blends exhibit "PVC-like" haptics. In addition, the films and sheets exhibit significantly less whitening when subjected to stress than the polypropylene component alone.

The present invention pertains to a fabricated article prepared from a blend comprising;

A) from 30 to 95 weight percent of one or more propylene homopolymers or copolymers and B) from 5 to 70 weight percent of at least one substantially random interpolymers;

wherein said substantially random interpolymer comprises monomer units derived from a) about 1.5 to 15 mol percent of vinyl aromatic monomer;

b) about 3 to 50 mol percent of propylene; and c) the balance comprising ethylene, and optionally one or more additional olefin monomers;

C) from 0 to 50 weight percent of one or more polymer components selected from styrenic homopolymers and copolymers, including random styrene/diene copolymers and hydrogenated random styrene butadiene copolymer, ethylene homopolymers and copolymers, including ethylene/styrene interpolymers, and styrenic block copolymers, and D) from 0 to 80 weight percent of one or more fillers.

The present invention further pertains to a fabricated article prepared from said blend compositions in the form of a film, a sheet or as a layer in a multi-layer film structure produced by calendering, blow molding, casting, (co-) extrusion or extrusion casting operations.

The present invention still further pertains to films and sheets prepared from blends of one or more substantially random ethylene/propylene/vinyl aromatic monomer interpolymers with one or more propylene homopolymers and/or copolymers, such sheets or films having less than or equal to 20 percent haze and, when fabricated into 0.38 mm (15 mil) thickness, have a room temperature total dart impact energy of greater than or equal to 0.103 kg m (0.75 ft lb).

The present invention also pertains to fabricated articles produced by compression molding, injection molding, blow molding or thermoforming operations, and to foams and fibers comprising said blends. Said fabricated articles exhibit enhanced low temperature toughness, and/or heat resistance or upper service temperature.

DESCRIPTION OF EMBODIMENTS OF THE INVENTION

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time, is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "film" as used herein means a film having a thickness of 0.002 to 6.35 mm (0.1 to 250 mil). Usually, films of greater than 0.25 mm (10 mil) thickness are also referred to as sheets, and both terms are used interchangeably herein.

The term refractive index as used herein refers to the refractive index measured at 25° C. on compression molded samples using the following method: Compression Molding: Samples were melted at 190° C. for 3 min and compression molded at 190° C. under 9072 kg (20,000 lb) of pressure for another 2 min. Subsequently, the molten materials were quenched in a press equilibrated at room temperature.
Refractive Index Measurement: The refractive index was measured at a wavelength of 632.8 nm using a Model 2010 prism coupler made by Metricon Corporation.

The term "substantially random" in the substantially random interpolymer comprising polymer units derived from ethylene or ethylene in combination with one or more α-olefin monomers with one or more vinyl aromatic monomers as used herein means that the distribution of the monomers of said interpolymer can be described by the Bernoulli statistical model or by a first or second order Markovian statistical model, as described by J. C. Randall in *POLYMER SEQUENCE DETERMINATION, Carbon*-13 *NMR Method*, Academic Press New York, 1977, pp. 71–78. Preferably, substantially random interpolymers do not contain more than 15 percent of the total amount of vinyl aromatic monomer in blocks of vinyl aromatic monomer of more than 3 units. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The substantially random interpolymers used as blend components in the present invention are prepared by polymerizing i) ethylene, or ethylene in combination with one or more $C_4$ to $C_{20}$ α-olefin monomers, ii) one or more vinyl aromatic monomers, iii) propylene, and optionally iv) other polymerizable ethylenically unsaturated monomer(s).

Suitable α-olefins include for example, α-olefins containing from 4 to 20, preferably from 4 to 12, more preferably from 4 to 8 carbon atoms. Particularly suitable α-olefins are butene-1, 4-methyl-1-pentene, hexene-1 or octene-1. These α-olefins do not contain an aromatic moiety.

Suitable vinyl aromatic monomers, which can be employed to prepare the interpolymers, include, for example, those represented by the following formula:

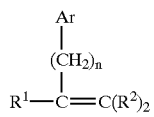

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary vinyl aromatic monomers include styrene, vinyl toluene, α-methylstyrene, t-butyl styrene, chlorostyrene, including all isomers of these compounds. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic vinyl monomer is styrene.

Other optional polymerizable ethylenically unsaturated monomer(s) include norbornene and $C_{1-10}$ alkyl or $C_{6-10}$ aryl substituted norbornenes. Further, one or more dienes can optionally be incorporated into the interpolymer to provide functional sites of unsaturation on the interpolymer useful, for example, to participate in crosslinking reactions. While conjugated dienes such as butadiene, 1,3-pentadiene (that is, piperylene), or isoprene may be used for this purpose, nonconjugated dienes are preferred. Typical nonconjugated dienes include, for example the open-chain nonconjugated diolefins such as 1,4-hexadiene (see U.S. Pat. No. 2,933, 480) and 7-methyl-1,6-octadiene (also known as MOCD); cyclic dienes; bridged ring cyclic dienes, such as dicyclopentadiene (see U.S. Pat. No. 3,211,709); or alkylidenenorbornenes, such as methylenenorbornene or ethylidenenorbornene (see U.S. Pat. No. 3,151,173). The nonconjugated dienes are not limited to those having only two double bonds, but rather also include those having three or more double bonds. The diene is incorporated in the substantially random interpolymers of the invention in an amount of from 0 to 15 weight percent based on the total weight of the interpolymer.

The most preferred substantially random interpolymers are the ethylene/propylene/styrene, ethylene/propylene/styrene/norbornene, and ethylene/propylene/styrene/diene interpolymers.

The substantially random interpolymers include the pseudo-random interpolymers as described in EP-416,815 B1 by James C. Stevens et al. and U.S. Pat. No. 5,703,187 by Francis J. Timmers. The substantially random interpolymers also include the interpolymers of ethylene, olefinic monomers and vinyl aromatic monomers as described in U.S. Pat. No. 5,872,201 by Yunwa W. Cheung et al. The substantially random interpolymers can be prepared by polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from –30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts, co catalysts, and methods for preparing the substantially random interpolymers are disclosed in U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; 5,721,185, 5,866,704, 5,959,047, 5,919,983, 6,015,868, 6,118,013 and 6,150,297.

The substantially random α-olefin/vinyl aromatic interpolymers can also be prepared by the methods described in JP 07/278230 employing compounds shown by the general formula

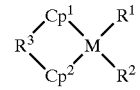

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in WO 98/09999 by Francis J. Timmers et al., the entire contents of which are herein incorporated by reference. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Sernetz and Mulhaupt (J. Polym. Sci., 35, 2549, 1997) have described metallocene-catalyzed ethene-styrene co- and terpolymerization with olefinic termonomers, including propylene. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in DE 197 11 339 A1 and U.S. Pat. No. 5,883,213 to Denki Kagaku Kogyo K K.

While preparing the substantially random interpolymer, an mount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non-solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

Propylene polymers usable in this invention may be either homopolymers or copolymers (random or impact). In terms of copolymers, the propylene is suitably copolymerized with one or more monomers copolymerizable therewith, but preferably with at least one other olefin or alpha olefin. Olefins include ethylene and alpha olefins, which include propylene, 1-butene, 1-pentene, 1-hexene, 1-octene, 1-nonene, 1-decene, 1-unidecene, 1-dodecene as well as 4-methyl-1-pentene 4-methyl-1-hexene, 5-methyl-5-hexene, vinylcyclohexane. Preferred olefins and alpha olefins for copolymerization with propylene include ethylene, 1-butene, and other higher alpha olefins, that is alpha olefins having at least 5 to 20 carbon atoms, more preferably butene, and higher alpha olefins, most preferably 4-methyl-1-pentene, pentene, hexene-1 or octene-1. Also considered as suitable comonomers are vinyl aromatic monomers, especially styrene and substituted styrenes. The comonomers, or combination of comonomers, are used in any relative quantities within the definitions of the polymers.

The propylene polymers are preferably isotactic or syndiotactic, more preferably isotactic, most preferably having an isotacticity as measured by $^{13}$C NMR of at least 50 percent.

Impact propylene copolymers are commercially available and are well within the skill in the art, for instance, as described by E. P. Moore, Jr in *Polypropylene Handbook*, Hanser Publishers, 1996, page 220 and U.S. Pat. Nos. 3,893,989 and 4,113,802. The term "impact copolymer" is used herein to refer to heterophasic propylene copolymers where polypropylene is the continuous phase and an elastomeric phase is uniformly dispersed therein. The impact copolymers result from an in-reactor process rather than physical blending. Usually the impact copolymers are formed in a dual or multi-stage process, which optionally involves a single reactor with at least two process stages taking place therein, or optionally multiple reactors. The impact copolymers can be transparent.

A discussion of various polypropylene polymers is contained in *Modern Plastics Encyclopedia*/89, mid October 1988 Issue, Volume 65, Number 11, pp. 86–92.

The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear.

The melt flow rate for the polypropylene useful herein is generally from 0.1 grams/10 minutes (g/10 min) to 200 g/10 min, preferably from 0.5 g/10 min to 100 g/10 min, and especially from 1 g/10 min to 50 g/10 min.

The most preferred propylene polymer is isotactic polypropylene or a random propylene copolymer.

Optional polymeric components which can be included in the blends of propylene homopolymers or copolymers and substantially random interpolymers are selected from styrenic homopolymers and copolymers, including random styrene/diene copolymers and hydrogenated random styrene butadiene copolymer, ethylene homopolymers and copolymers, including ethylene/styrene interpolymers, and styrenic block copolymers. Suitable block copolymers having unsaturated rubber blockinclude, but are not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene block copolymers. Preferred block copolymers have saturated rubber monomer units, and include styrene/ethylene-butene copolymers, styrene/ethylene-propylene copolymers, styrene/ethylene-butene/styrene (SEBS) copolymers, styrene/ethylene-propylene/styrene (SEPS) copolymers. Block copolymers useful in the present invention are commercially available, such as, for example, supplied by Shell Chemical Company under the designation of KRATON™ and supplied by Dexco Polymers under the designation of VECTOR™.

Also included as optional components of the compositions used in the present invention are various organic and inorganic fillers, the identity of which depends upon the type of application for which the composition is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, barium, calcium or magnesium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk. Also included are the various classes of fillers that act as anti-microbial agents. Mixtures of more than one such filler may be used as well. Fillers, when employed, are used in amounts of up to 90 weight percent, more typically up to 80 weight percent of the overall composition.

Additives such as antioxidants (for example, hindered phenols such as, for example, Irganox™ 1010), phosphites (for example, Irgafos™ 168) both trademarks of, and commercially available from, Ciba Geigy Corporation), U. V. stabilizers, cling additives (for example, polyisobutylene), antiblock additives, colorants, pigments, fillers, tackifiers are optionally also included in the substantially random interpolymers, either in the component interpolymers and/or the overall blend compositions of the present invention, to the extent that they do not interfere with the enhanced properties discovered by Applicants.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives are advantageously employed in the range of from 0.05 to 50, preferably from 0.1 to 35, more preferably from 0.2 to 20 percent by weight based upon the weight of the polymer or polymer blend.

Processing aids, which are also referred to herein as plasticizers, can also be included in the substantially random interpolymer blend components and/or the overall blend compositions of the present invention., and include the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil (such as Kaydol™ oil (available from and a registered trademark of Witco), and Shellflex™ 371 naphthenic oil (available from and a registered trademark of Shell Oil Company). Another suitable oil is Tuflo™ oil (available from and a registered trademark of Lyondell).

The blends of the present invention may be prepared by known methods including, but not limited to, solution blending, or dry blending the interpolymer blend components in a pelletized form in the desired proportions followed by melt blending in an extruder, Banbury mixer or the like. The dry blended pellets may be directly melt processed into a final solid state article by, for example, injection molding. Alternatively, the blends may be made by direct polymerization, without isolation of the blend components, using for example two or more catalysts in one reactor, or by using a single catalyst and two or more reactors in series or parallel.

The fabricated articles of the present invention include, but are not limited to molded articles, films and sheets, foams and fibers. The present invention further pertains to a fabricated article in the form of a film, a sheet or as a layer in a multi-layer film structure produced by calendering, blow molding, casting, (co-)extrusion or extrusion coating operations. Especially preferred film and sheet structures have desirable optical properties such as transparency, low haze and/or controlled gloss.

Specific applications of the films include footwear (including use as logo films), decorative laminate film, display packaging, blister packaging including packaging for medical devices. Other applications include shrink wrapped and vacuum packed articles, films for tamper resistant bottles, labels for medical packaging, bottle labels, and films for office products.

In addition to films, the blends can be used in the manufacture of fibers, foams and latexes and molded articles. The fabricated articles can be produced by compression molding, injection molding, rotational molding, blow molding extrusion or thermoforming operations.

Applications which can utilize the above polymer compositions include, but are not limited to, power distribution systems, such as wire and cable, construction materials such as flooring systems, sound and vibration management systems, toys, sporting goods, appliances, automotive interiors (trim, mats, insulation), automotive exteriors, automotive under the hood, lawn and garden, personal protective wear, apparel, foot wear, traffic cones, housewares, films, multilayer films, sheets, barrier membranes, protective coatings, coated fabrics, medical tubing and hoses, industrial tubing and hoses, profile extrusions, seals and gaskets, handles and grips. upholstery, industrial covers, luggage, artificial leather goods, and tapes. Applications further include medical devices including oxygen masks and mouthguards, pharmaceutical vials, lids containers, cosmetics and personal care packaging, caps and closures, food service trays, reusable tableware, CD/DVD jewel boxes, small appliances and power tools. The fabricated articles include foams and fibers comprising said blends.

When in the form of foams, compositions of the present invention may be used in applications including, without limit, cushion packaging (for example, comer blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underlayment, sound insulation); flotation (for example, life jackets, vests and belts); sports and leisure or athletic and recreational products (for example, gym mats and bodyboards); egg cartons, meat trays, fruit trays, thermal insulation (such as that used in building and construction for wall sheathing, roofing, foundation insulation and residing underlayment); acoustical insulation (for example, for appliances and building and construction); pipe insulation, insulation for refrigeration, buoyancy applications (for example, floatintg docks and rafts), floral and craft products, pallets, luggage liners, desk pads, footwear (including shoe soles), insulation blankets for greenhouses, case inserts, display foams, gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad. The foregoing list merely illustrates a number of suitable applications. Skilled artisans can readily envision additional applications without departing from the scope or spirit of the present invention.

The blends have at least one propylene homopolymer or copolymer component which comprises from 30 to 95, preferably from 60 to 90, more preferably from 70 to 85 weight percent of the total blend composition, as well as at least one substantially random ethylene/propylene/vinyl aromatic interpolymer component which comprises from 5 to 70, preferably from 10 to 40, more preferably from 15 to 30 weight percent of the total blend composition, and for which the substantially random ethylene/propylene/vinyl aromatic interpolymer component in turn comprises;

a) from 1.5 to 15, preferably from 2 to 6.5, most preferably from 2.5 to 6 mol percent vinyl aromatic monomer, preferably styrene; and b) from 3 to 50, preferably from 5 to 25, most preferably from 7 to 20 mol percent propylene; and c) the balance comprising ethylene, and optionally one or more additional olefin monomers.

In one preferred embodiment of the present invention it is important that the absolute difference between the refractive index of said polypropylene homopolymer or copolymer and said substantially random interpolymer is less than or equal to 0.02, preferably less than or equal to 0.015, more preferably less than or equal to 0.01, (when the refractive index is measured for compression molded film at 25° C.).

We have surprisingly found that sheets or films fabricated from such blends, when fabricated into 0.38 mm (15 mil) thickness film, have less than or equal to 20, preferably less than or equal to 16, more preferably less than or equal to 13 percent haze. We have also surprisingly found in addition the films and sheets exhibit significantly less whitening when subjected to stress.

Also, the films when fabricated at 0.25 mm (10 mil) thickness have a haze value within plus or minus 65 percent of the haze value of a film of the same thickness and made under the same conditions but made with solely said one or more propylene homopolymers or copolymers; and a machine direction 2 percent secant modulus of at least 50 percent that of the modulus of a film of the same thickness and made under the same conditions but made solely from said one or more propylene homopolymers or copolymers; and Also, the films when fabricated at 0.38 mm (15 mil) thickness have a total dart impact energy (RT) which is at least four, preferably six times, more preferably eight times higher of a film of the same thickness and made under the same conditions but made solely from said one or more propylene homopolymers or copolymers.

The following examples are to illustrate this invention but do not limit it.

EXAMPLES

Preparation of Substantially Random Interpolymers Blend Components

EPS 1, EPS 2 and ES 1 are substantially random interpolymers prepared using the following polymerization procedure.

EPS 1, EPS 2 and ES 1 were prepared in a continuously operating loop reactor, an Ingersoll-Dresser twin screw pump provided the mixing. The reactor ran liquid full at 475 psig (3,275 kPa). Raw materials and catalyst/cocatalyst flows were fed into the reactor through injectors and Kenics static mixers in the loop reactor piping. From the discharge of the loop pump, the process flow goes through two shell and tube heat exchangers before returning to the suction of the loop pump. Upon exiting the last exchanger, loop flow returned through the injectors and static mixers to the suction of the pump. A second monomer/feed injector and mixer was used if available. Heat transfer oil or tempered water was circulated through the exchangers' jacket to control the loop temperature. The exit stream of the loop reactor was taken off between the two exchangers. The flow and solution density of the exit stream was measured by a Micro-Motion™ mass flow meter.

Solvent was injected to the reactor primarily as part of the feed flow to keep the ethylene in solution. A split stream from the pressurization pumps prior to ethylene injection was taken to provide a flush flow for the loop reactor pump seals. Additional solvent is added as a diluent for the catalyst. Feed solvent was mixed with uninhibited styrene monomer on the suction side of the pressurization pump. The pressurization pump supplied solvent and styrene to the reactor at approximately 650 psig (4,583 kPa). Fresh styrene flow was measured by a Micro-Motion™ mass flow meter, and total solvent/styrene flow was measured by a separate Micro-Motion™ mass flow meter. Ethylene was supplied to the reactor at approximately 690 psig (4,865 kPa). The ethylene stream was measured by a Micro-Motion™ mass flow meter. A flow meter/controller was used to deliver hydrogen into the ethylene stream at the outlet of the ethylene control valve.

The ethylene/hydrogen mixture is at ambient temperature when it is combined with the solvent/styrene stream. The temperature of the entire feed stream as it entered the reactor loop was lowered to approximately 2° C. by a glycol-cooled exchanger. Preparation of the three catalyst components took place in three separate tanks. Fresh solvent and concentrated catalyst/cocatalyst/secondary co-catalyst premix were added and mixed into their respective run tanks and fed into the reactor via a variable speed Pulsafeeder™ diaphragm pumps. As previously explained, the three component catalyst system entered the reactor loop through an injector and static mixer into the suction side of the twin screw pump. The raw material feed stream was also fed into the reactor loop through an injector and static mixer upstream of the catalyst injection point or through a feed injector/mixer between the two exchangers, if available.

Polymerization was stopped with the addition of catalyst kill (water) into the reactor product line after the Micro-Motion™ mass flow meter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to approximately 450 mm Hg (60 kPa) of absolute pressure at the reactor pressure control valve.

This flashed polymer entered the devolatilization section of the process. The volatiles flashing from the devolatilization were condensed with a glycol-jacketed exchanger, passed through vacuum pump, and were discharged to vapor/liquid separation vessel. In the first stage vacuum system, solvent/styrene were removed from the bottom of this vessel as recycle solvent while unreacted ethylene exhausted from the top. The ethylene stream was measured with a Micro-Motion™ mass flow meter. The measurement of vented ethylene plus a calculation of the dissolved gases in the solvent/styrene stream were used to calculate the ethylene conversion. The polymer and remaining solvent was pumped with a gear pump to a final devolatilizer. The pressure in the second devolatilizer was operated at approximately 10 mm Hg (1.4 kPa) absolute pressure to flash the remaining solvent. The dry polymer (<1000 ppm total volatiles) was pumped with a gear pump to an underwater pelletizer with spin-dried, and collected. The preparation conditions for each sample are varied to produce the specific interpolymers summarized in Table 1.

Test Methods.

Melt Flow Measurements: Unless otherwise stated, the molecular weight of the polymer compositions for use in the present invention is conveniently indicated using a melt index measurement according to ASTM D-1238, Condition 190° C./2.16 kg (formally known as "Condition (E)" and also known as $I_2$) was determined.

MD 2 percent secant modulus, MD percent elongation, MD tensile toughness, MD yield stress were measured according to ASTM D-882

Percent Haze was measured according to ASTM D-1003

Dart Impact Energy was measured according to ASTM D-1709

Styrene Analyses

Interpolymer styrene content and atactic polystyrene concentration were determined using proton nuclear magnetic resonance ($^1$H N.M.R). The total styrene content was also determined by quantitative Fourier Transform Infrared spectroscopy (FTIR).

TABLE 1

Summary of Properties of Interpolymer Blend Components.

|  | I2 (dg/min) | wt percent E | wt percent P | wt percent S | mol percent E | mol percent P | mol percent S |
|---|---|---|---|---|---|---|---|
| EPS 1 | 1.0 | 70 | 16 | 14 | 83 | 13 | 4 |
| EPS 2 | 1.2 | 71 | 5 | 24 |  |  |  |
| ES 1 | 1.0 | 70 | N/A | 30 | 90 |  | 10 |

Additional Blend Components

HPP is INSPiRE™ H110-02N is a propylene polymer having a melt flow rate (ASTM 1238 condition D, 230° C., 2.16 kg) of 2.2 g/10 min and is a trademark of and available from The Dow Chemical Company.

RC-PP is Profax™ SR 256M is an propylene/ethylene copolymer having a melt flow rate (ASTM 1238 condition D, 230° C., 2.16 kg) of 2.0 g/10 min and is a trademark of and available from Montell.

AFFINITY™ 8100 is an ethylene/octene polyolefin plastomer having a melt index, I2 of 1.00 g/10 min and a density of 0.870 g/cm$^3$ and is a trademark of and available from The Dow Chemical Company.

Film Preparation

The films were prepared using a 25 mm Haake Polylab system co-rotating intermeshing twin screw extruder having an L/D of 36 with a 152.4 mm (6 in) flat Haake sheet die and a tape and ribbon take off unit with a K-tron K2MVT 20 twin auger feeder. The melt temperature was set at 230° C. and output rate was set at 150 rpm. The chill roll temperature was set at 48.8° C. (120° F.) and the pull away rate was adjusted to between 2.92 to 3.84 km/hr (160 to 210 ft/min) for 0.38 mm (15 mil) film and between 5.21 to 6.21 km/hr (285 and 340 ft/min) for 0.25 mm (10 mil) film.

TABLE 2

(15 mil Sheets)

| PP Blend Component | | Ex 1 | Ex 2 | Ex 3 | Comp Ex 1 |
|---|---|---|---|---|---|
| Blend Composition | HPP | 90 wt percent HPP + 10 wt percent EPS 1 | 80 wt percent HPP + 20 wt percent EPS 1 | 80 wt percent HPP + 20 wt percent EPS 2 | 80 wt percent HPP + 20 wt percent ES 1 |
| MD 2 percent Secant modulus kPa (psi) | 178.4 (119902.1) | 169.1 (113686.7) | 151.8 (102007.7) | 144.6 (97215.9) | 145.9 (98079.1) |
| Percent difference of MD 2 percent Secant modulus of blend v HPP[a] | — | −5.2 | −14.9 | −18.9 | −18.2 |
| MD percent Elongation (percent) | 953.8 | 445.2 | 439.3 | 925.2 | 1229.6 |
| MD Tensile toughness kg · m (ft-lb) | 585.8 (4237.7) | 281.3 (2035.1) | 234.1 (1693.7) | 472.5 (3417.9) | 268.2 (4109.8) |
| MD Ultimate Tensile kPa (psi) | 11.7 (7878.2) | 9.2 (6213.8) | 7.9 (5358.3) | 9.7 (6540.4) | 9.3 (6315.3) |
| MD Yield Stress kPa (psi) | 8.5 (5747.3) | 8.5 (5773.9) | 7.3 (4935.6) | 6.7 (4542.5) | 6.4 (4347.4) |
| Avg Haze Value (percent) | 10.9 | 9.9 | 11.6 | 25.2 | 39.3 |
| Std Dev Haze Value | 0.3 | 0.2 | 0.6 | 0.7 | 0.3 |
| Percent difference of Haze of blend v HPP[b] |  | −9.2P | +6.4 | +131.2 | −260.6 |
| Total Dart Impact Energy m · kg (ft-lb) RT | 0.03 (0.22) | 0.31 (2.26) | 0.28 (2.05) | 0.30 (2.2) | 0.31 (2.23) |
| Total Dart Impact Energy m · kg (ft-lb) −20C | 0.01 (0.11) | 0.06 (0.49) | 0.17 (1.24) | 0.17 (1.23) | 0.20 (1.49) |

[a]Percent difference = (Modulus$_{PP}$ − Modulus$_{Ex}$)/Modulus$_{Ex}$ × 100
[b]Percent difference = (Haze$_{HPP}$ − Haze$_{Ex}$)/Haze$_{Ex}$ × 100

TABLE 3

(10 mil Sheets)

| | PP Blend Component | EPS Blend Component | Ex 4 | Ex 5 |
|---|---|---|---|---|
| Blend Composition | 100 percent RC-PP | 100 percent EPS 1 | 80 wt percent RC-PP + 20 wt percent EPS 1 | 70 wt percent RC-PP + 30 wt percent EPS 1 |
| MD 2 percent Secant modulus kPa (psi) | 138.5 (93099.7) | 1.2 (865.0) | 104.3 (70130.7) | 89.7 (60337.9) |
| Percent difference[a] of MD 2 percent Secant modulus of blend v RC-PP | | | −24.7 | −35.2 |
| MD percent Elongation (percent) | 450.3 | 581.1 | 311.7 | 366.1 |
| MD Tensile toughness m · kg (ft-lb) | 248.6 (1798.3) | 57.9 (419.2) | 145.7 (1054.2) | 139.7 (1010.5) |
| MD Ultimate Tensile kPa (psi) | 9.8 (6619.6) | 2.9 (1961.4) | 7.8 (5293.7) | 7.0 (4706.3) |
| MID Yield Stress kPa (psi) | 8.0 (5377.8) | 0.5 (376.6) | 6.0 (4052.2) | 5.4 (3653.4) |
| Avg Haze Value (percent) | 4.8 | 11.7 | 6.0 | 7.7 |
| Std Dev Haze Value | 0.2 | 0.9 | 0.4 | 1.5 |
| Percent difference[b] of Haze of blend v RC-PP | | | 25.0 | 60.4 |

[a]Percent difference = (Modulus$_{PP}$ − Modulus$_{Ex}$)/Modulus$_{Ex}$ × 100
[b]Percent difference = (Haze$_{HPP}$ − Haze$_{Ex}$)/Haze$_{Ex}$ × 100

TABLE 4

(10 mil Sheets)

| | PP Blend Component | EPS Blend Component | Ex 6 | Ex 7 | Ex 8 | Ex 9 | Ex 10 | Comp Ex 2 | Comp Ex 3 |
|---|---|---|---|---|---|---|---|---|---|
| Blend Composition | 100 percent HPP | 100 percent EPS 1 | 90 wt percent HPP + 10 wt percent EPS 1 | 80 wt percent HPP + 20 wt percent EPS 1 | 70 wt percent HPP + 30 wt percent EPS 1 | 50 wt percent HPP + 50 wt percent EPS 1 | 30 wt percent HPP + 70 wt percent EPS 1 | 20 wt percent HPP + 80 wt percent EPS 1 | 80 wt percent HPP + 20 wt percent AFFINITY ™ 8100 |
| MD 2 percent Secant modulus kPa (psi) | 184.9 (124258.3) | 1.2 (865.0) | 164.9 (110851.1) | 139.2 (93549.4) | 137.5 (92413.3) | 74.9 (50358.8) | 42.8 (28785.0) | 21.1 (14240.1) | 111.5 (74930.7) |
| Percent difference of MD 2 percent Secant modulus of blend v HPP[a] | | | −10.8 | −24.7 | −25.6 | −59.5 | −76.8 | −88.5 | −39.7 |
| MD percent Elongation (percent) | 538.8 | 581.1 | 589.3 | 394.7 | 233.2 | 559.5 | 530.9 | 504.3 | 276.9 |
| MD Tensile toughness m · kg (ft-lb) | 314.5 (2275.3) | 57.9 (419.2) | 268.2 (1940.1) | 160.3 (1159.5) | 127.9 (925.7) | 161.1 (1165.9) | 109.4 (791.5) | 86.6 (626.8) | 167.2 (1209.4) |
| MD Ultimate Tensile kPa (psi) | 10.6 (7164.5) | 2.9 (1961.4) | 7.4 (4982.1) | 6.7 (4568.1) | 8.1 (5480.3) | 5.3 (3582.6) | 3.9 (2673.1) | 3.5 (2367.7) | 9.1 (6152.9) |
| MD Yield Stress kPa (psi) | 8.9 (5989.9) | 0.5 (376.6) | 6.8 (4572.5) | 5.8 (3959.8) | 7.7 (5196.5) | 3.8 (2565.4) | 2.2 (1527.1) | 2.3 (1560.9) | 8.3 (5583.6) |
| Avg Haze Value (percent) | 7.5 | 11.7 | 8.8 | 10.4 | 12.2 | 15.2 | 13.7 | 18.0 | 12.8 |
| Std Dev Haze Value | 0.7 | 0.9 | 0.4 | 1.1 | 3.5 | 2.5 | 0.9 | 0.9 | 1.6 |
| Percent difference of Haze of blend v HPP[b] | | | +17.3 | +38.7 | +62.7 | +102.7 | +82.7 | +140.0 | +70.7 |

[a]Percent difference = (Modulus$_{PP}$ − Modulus$_{Ex}$)/Modulus$_{Ex}$ × 100
[b]Percent difference = (Haze$_{HPP}$ − Haze$_{Ex}$)/Haze$_{Ex}$ × 100

What is claimed is:

1. A fabricated article prepared from a blend comprising:
   A. from 30 to 93 weight percent of one or more homopolymers or copolymers and
   B. from 5 to 70 weight percent of at least one substantially random interpolymer;
   wherein said substantially random interpolymer comprises monomer units derived from
   (a) about 1.5 to 15 mol percent of vinyl aromatic monomer;
   (b) about 3 to 50 mol percent of propylene; and
   (c) the balance being ethylene;

C. from 0 to 50 weight percent of one or more polymer selected from styrenic homopolymers and copolymers, including random styrene/diene copolymers and hydrogenated random styrene butadiene copolymer, ethylene homopolymers and copolymers, including ethylene/styrene interpolymers, and styrenic block copolymers, and D. from 0 to 80 weight percent of one or more fillers, wherein the fabricated article is in the form of a film, a sheet or as a layer in a multi-layer film structure, wherein the absolute difference between the refractive index of said polypropylene homopolymer or copolymer and the refractive index of said substantially random interpolymer is less than or equal to 0.020; and with the proviso that the fabricated article is free of conductive additives.

2. A fabricated article prepared from a blend comprising;

A. from 60 to 90 weight percent of one or more propylene homopolymers or copolymers and B. from 10 to 40 weight percent of at least one substantially random interpolymers;
wherein said substantially random interpolymer comprises monomer units derived from
(a) about 2 to 6.5 mol percent of vinyl aromatic monomer;
(b) about 5 to 25 mol percent of propylene; and
(c) the balance being ethylene,
wherein the fabricated article is in the form of a film, a sheet or as a layer in a multi-layer film structure,
wherein the absolute difference between the refractive index of said polypropylene homopolymer or copolymer and the refractive index of said substantially random interpolymer is less than or equal to 0.020; and
wherein said blend when fabricated into 15 mil thickness film has a total dart impact energy (RT) which is at least four times higher of a film of the same thickness and made under the same conditions but made solely from said one or more propylene homopolymers or copolymers.

3. The fabricated article of claim 1 and wherein said blend, when fabricated into 10 mil thickness film has:
A. a haze value within plus or minus 65 percent of the haze value of a film of the same thickness and made under the same conditions but made with solely said one or more propylene homopolymers or copolymer; and
B. a machine direction 2 percent secant modulus of at least 50 percent that of the modulus of a film of the same thickness and made under the same conditions but made solely from said one or more propylene homopolymers or copolymers.

4. The fabricated article of claim 1 wherein said blend comprises;
A. from 60 to 90 weight percent of one or more propylene homopolymers or copolymers and
B. from 10 to 40 weight percent of at least one substantially random interpolymers;
wherein said substantially random interpolymer comprises monomer units derived from
(a) about 2 to 6.5 mol percent of styrene;
(b) about 5 to 25 mol percent of propylene monomer; and
(c) the balance being ethylene, wherein
(i) the absolute difference between the refractive index of said polypropylene homopolymer or copolymer and the refractive index of said substantially random interpolymer is less than or equal to 0.015; and
wherein
(ii) said film when fabricated into 15 mil thickness film has a total dart impact energy (RT) which in at least six times higher of a film of the same thickness and made under the same conditions but made solely from said one or more propylene homopolymers or copolymers.

5. The fabricated article of claim 1 wherein said blend comprises
A. from 70 to 85 percent of one or more propylene homopolymers or copolymers and
B. from 15 to 30 weight percent of at least one substantially random interpolymers;
wherein said substantially random interpolymer comprises monomer units derived from
(a) about 2.5 to 6 mol percent of styrene monomer
(b) about to 7 to 20 mol percent of propylene monomer; and
(c) the balance being ethylene;
wherein
(i) the absolute difference between the refractive index of said polypropylene homopolymer or copolymer and the refractive index of said substantially random interpolymer is than or equal to 0.010; and
wherein
(ii) said film when fabricated into 15 mil thickness film has a total dart impact energy (RT) which is at least eight times higher of a film of the same thickness and made under the same conditions but made solely from said one or more propylene homopolymers or copolymers.

6. The composition of claim 1 wherein said Component A is isotactic polypropylene and said Component B is a substantially random ethylene/propylene/styrene interpolymer.

7. The fabricated article of claim 2 and wherein said blend, when fabricated into 10 mil thickness film has:
A. a haze value within plus or minus 65 percent of the haze value of a film of the same thickness and made under the same conditions but made with solely said one or more propylene homopolymers or copolymers; and
B. a machine direction 2 percent secant modulus of at least 50 percent that of the modulus of a film of the same thickness and made under the same conditions but made solely from said one or more propylene homopolymers or copolymers.

8. The fabricated article of claim 2 wherein said blend comprises;
A. from 60 to 90 weight percent of one or more propylene homopolymers or copolymers and
B. from 10 to 40 weight percent of at least one substantially random interpolymers;
wherein said substantially random interpolymer comprises monomer units derived from
(a) about 2 to 6.5 mol percent of styrene;
(b) about 5 to 25 mol percent of propylene monomer; and
(c) the balance being ethylene, wherein
i) the absolute difference between the refractive index of said polypropylene homopolymer or copolymer and the refractive index of said substantially random interpolymer is less than or equal to 0.015; and wherein (ii) said film when fabricatad into 15 mil thickness film has a total dart impact energy (RT) which is at least six times higher of a film of the same thickness and made under the same conditions but made solely from said one or more propylene homopolymers or copolymers.

9. The fabricated article of claim 2 wherein said blend comprises

A. from 70 to 85 weight percent of one or more propylene homopolymers or copolymers and B. from 15 to 30 weight percent of at least one substantially random interpolymers;

wherein said substantially random interpolymer comprises monomer units derived from (a) about 2.5 to 6 mol percent of styrene monomer
(b) about 7 to 20 mol percent of propylene monomer; and (c) the balance being ethylene;

wherein (i) the absolute difference between the refractive index of said polypropylene homopolymer or copolymer and the refractive index of said substantially random interpolymer is than or equal to 0.010; and wherein (ii) said film when fabricated into 15 mil thickness film has a total dart impact energy (RT) which is at least eight times higher of a film of the same thickness and made under the same conditions but made solely from said one or more propylene homopolymers or copolymers.

10. The composition of claim 2 wherein said Component A is isotactic polypropylene and said Component B is a substantially random ethylene/propylene/styrene interpolymer.

* * * * *

UNITED STATES PATENT AND TRADEMARK OFFICE
CERTIFICATE OF CORRECTION

PATENT NO. : 6,946,520 B2 Page 1 of 1
APPLICATION NO. : 10/468171
DATED : September 20, 2005
INVENTOR(S) : Seema V. Karande et al.

It is certified that error appears in the above-identified patent and that said Letters Patent is hereby corrected as shown below:

Column 18, Line 27  Insert the word -- less -- following the word "is".
Column 20, Line 6   Insert the word -- less -- following the word "is".

Signed and Sealed this

Tenth Day of October, 2006

JON W. DUDAS
*Director of the United States Patent and Trademark Office*